United States Patent [19]

Kreutzburg et al.

[11] Patent Number: 5,068,824

[45] Date of Patent: Nov. 26, 1991

[54] METHOD OF SETTING THE OPERATING PARAMETERS IN A MICROPROCESSOR-CONTROLLED TYPEWRITER OR OTHER MICROPROCESSOR-CONTROLLED OFFICE MACHINE

[75] Inventors: Franz Kreutzburg, Zetel; Kurt-G. Galleck, Wilhelmshaven, both of Fed. Rep. of Germany

[73] Assignee: AEG Olympia Aktiengesellschaft, Wilhelmshaven, Fed. Rep. of Germany

[21] Appl. No.: 239,497

[22] Filed: Sep. 1, 1988

[30] Foreign Application Priority Data

Sep. 1, 1987 [DE] Fed. Rep. of Germany ....... 3729097

[51] Int. Cl.[5] .......................... G06F 3/02; G06F 3/06; G06F 3/12

[52] U.S. Cl. .................................... 395/800; 364/236; 364/928; 364/928.1; 364/982.2; 364/130; 364/221.8; 364/244.6; 364/260; 364/DIG. 1; 364/DIG. 2; 400/63

[58] Field of Search ... 364/200 MS File, 900 MS File, 364/519, 521; 400/83, 279-282, 61-77; 340/712, 721

[56] References Cited

U.S. PATENT DOCUMENTS

| | | | |
|---|---|---|---|
| 3,889,062 | 6/1975 | Epstein | 364/200 |
| 4,106,101 | 8/1978 | Harrison | 364/709 |
| 4,308,582 | 12/1981 | Berger | 400/63 |
| 4,419,736 | 12/1983 | Christensen et al. | 364/900 |
| 4,491,933 | 1/1985 | Ursin et al. | 364/900 |
| 4,556,959 | 12/1985 | Allen et al. | 340/712 |
| 4,618,275 | 10/1986 | Brinkmann et al. | 400/695 |
| 4,629,341 | 12/1986 | Brinkmann et al. | 400/76 |
| 4,679,137 | 7/1987 | Lane et al. | 364/200 |
| 4,775,953 | 10/1988 | Goettelmann et al. | 364/900 |
| 4,899,137 | 2/1990 | Behrens et al. | 340/711 |
| 4,924,433 | 5/1990 | Hirata et al. | 340/709 |

OTHER PUBLICATIONS

Peter Rinearson, Word Processing Power with Microsoft Word, Microsoft Press, 1985.

Chiwriter, The Scientific/Multifont Word Processor, Horstman, Software Design Corporation, Ann Arbor, Jul. 1987.

*Primary Examiner*—Thomas C. Lee
*Assistant Examiner*—Mehmet Geckil
*Attorney, Agent, or Firm*—Spencer & Frank

[57] ABSTRACT

A method of setting the operating parameters in a microprocessor controlled typewriter or like office machine having a microprocessor, a set-up initiating actuator, a data input keyboard which includes (i) a printer-advance actuator, (ii) a first command actuator, and (iii) a second command actuator, a memory, a record carrier, and a printing apparatus including the steps of:

(a) actuating the set-up initiating actuator disposed on the keyboard to enter a set-up mode and to recall a set-up plane which lists a plurality of sub-planes;
(b) displaying the set-up plane on the record carrier;
(c) selecting one of the plurality of sub-planes by using the printer-advance actuator;
(d) actuating the first command actuator to recall from memory the selected sub-plane and to print the parameters of the selected sub-plane upon the record carrier;
(e) selecting one of the values of the selected sub-plane by using the printer-advance actuator;
(f) storing the selected value in the memory;
(g) actuating the second command actuator to cause the microprocessor to (i) replace the stored values of the parameters of the selected sub-plane with the selected ones of the selected sub-plane, (ii) cause the printing apparatus to indicate the selected ones of the parameters of the selected sub-plane on the record carrier, (iii) recall from the memory the set-up plane, and (iv) cause the printing apparatus to display the set-up plane on the record carrier.

15 Claims, 8 Drawing Sheets

FIG. 3

104

| PLANE SECTION | : I E Q C S N L |
|---|---|
| INFORMATION | |
| CHARACTER SET | : 766/NORM 804 766/IBM 766/OAG TTX |
| AUTO LF | : ON OFF |
| AUTO CR | : ON OFF |
| PRINT PATH OPTIMIZATION | : ON OFF |
| FORM LENGTH | : 35 56 66 68 70 72 84 S XX |
| TOP MARGIN | : 1 2 3 4 5 6 S XX |
| BOTTOM MARGIN = FORM LENGTH - | : 0 1 2 3 4 5 6 S XX |
| PITCH | : 10 12 15 PS S |
| FONT | : OLYMPIA DIABLO |
| LINE SPACING | : 0.75 1 1.5 2 3 S |
| AUTOMATIC FORM FEED | : YES NO |
| PAPER FEED | : MANUAL EFE BIN1 BIN2 |
| TEXT TO MEMORY TRANSFER | : 1:1 DIABLO1 |
| EXTERNAL FLOW CONTROL | : YES NO |
| INTERFACE | : CENTRONICS RS 232 C |
| BAUD RATE | : 50 110 150 300 600 1200 2400 4800 9600 19.2K |
| CHARACTER LENGTH | : 7BITS 8BITS |
| PARITY | : EVEN ODD 8BITS+1 8BITS+0 NONE |
| STOP BITS | : 1 2 |
| HANDSHAKE | : RTS/CTS XOB/XOFF ETX/ACK |
| ECHO | : ON OFF |
| SELECTION CALL | : YES NO |
| CR-KEY | : CR/LF CR LF |
| TRANSMISSION CODE | : OLYMPIA DIABLO |

FIG. 6

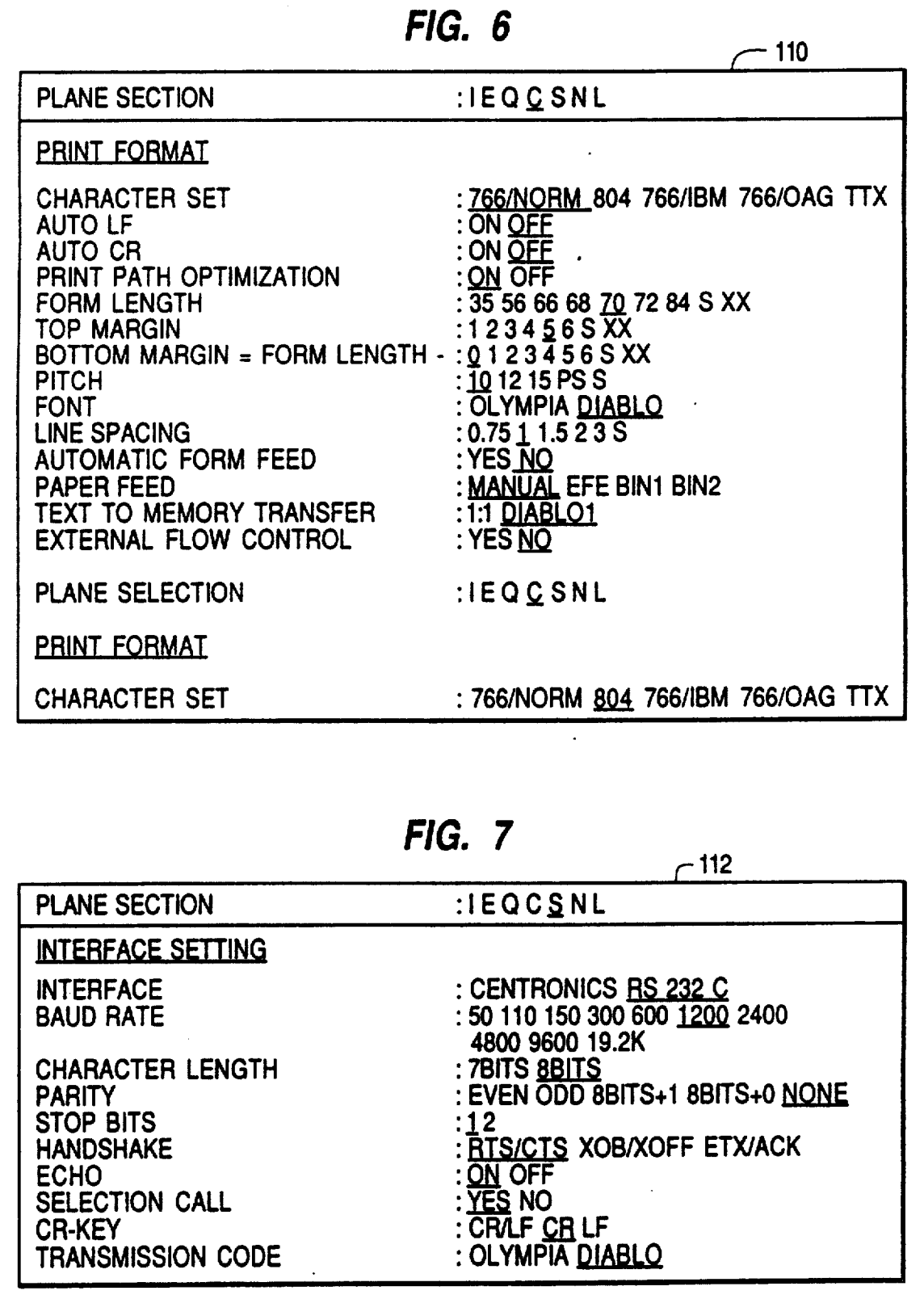

110

| | |
|---|---|
| PLANE SECTION | : I E Q C S N L |
| PRINT FORMAT | |
| CHARACTER SET | : 766/NORM 804 766/IBM 766/OAG TTX |
| AUTO LF | : ON OFF |
| AUTO CR | : ON OFF |
| PRINT PATH OPTIMIZATION | : ON OFF |
| FORM LENGTH | : 35 56 66 68 70 72 84 S XX |
| TOP MARGIN | : 1 2 3 4 5 6 S XX |
| BOTTOM MARGIN = FORM LENGTH - | : 0 1 2 3 4 5 6 S XX |
| PITCH | : 10 12 15 PS S |
| FONT | : OLYMPIA DIABLO |
| LINE SPACING | : 0.75 1 1.5 2 3 S |
| AUTOMATIC FORM FEED | : YES NO |
| PAPER FEED | : MANUAL EFE BIN1 BIN2 |
| TEXT TO MEMORY TRANSFER | : 1:1 DIABLO1 |
| EXTERNAL FLOW CONTROL | : YES NO |
| PLANE SELECTION | : I E Q C S N L |
| PRINT FORMAT | |
| CHARACTER SET | : 766/NORM 804 766/IBM 766/OAG TTX |

FIG. 7

112

| | |
|---|---|
| PLANE SECTION | : I E Q C S N L |
| INTERFACE SETTING | |
| INTERFACE | : CENTRONICS RS 232 C |
| BAUD RATE | : 50 110 150 300 600 1200 2400 4800 9600 19.2K |
| CHARACTER LENGTH | : 7BITS 8BITS |
| PARITY | : EVEN ODD 8BITS+1 8BITS+0 NONE |
| STOP BITS | : 1 2 |
| HANDSHAKE | : RTS/CTS XOB/XOFF ETX/ACK |
| ECHO | : ON OFF |
| SELECTION CALL | : YES NO |
| CR-KEY | : CR/LF CR LF |
| TRANSMISSION CODE | : OLYMPIA DIABLO |

FIG. 8

116

PLANE SECTION :I E Q C S N L

OLYMPIA / DATA LOGGER IFO 1.1

| ADR. | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 0000 | 1B | 32 | 1B | 51 | 1B | 1E | 09 | 1B | 1F | 0D | 1B | 09 | 01 | 1B | 39 | 1B | .2.Q..........9. |
| 0010 | 09 | 4C | 1B | 30 | 1B | 0C | 49 | 1B | 54 | 1B | 08 | 01 | 0D | 4D | 61 | 73 | .L.0..I.T....Mas |
| 0020 | 63 | 68 | 2E | 4E | 72 | 2E | 3A | 1B | 09 | 16 | 44 | 61 | 74 | 75 | 6D | 3A | ch.Nr.:...DATUM: |
| 0030 | 1B | 09 | 27 | 4E | 61 | 6D | 65 | 3A | 0D | 0A | 1B | 45 | 45 | 53 | 57 | 20 | ..'NAME:...EESW |
| 0040 | 31 | 30 | 30 | 30 | 2F | 32 | 30 | 30 | 30 | 28 | 44 | 49 | 41 | 42 | 4C | 4F | 1000/2000(DIABLO |
| 0050 | 29 | 2D | 54 | 65 | 73 | 74 | 20 | 1B | 57 | 45 | 69 | 6E | 73 | 63 | 68 | 72 | )-TEST .WEinschr |
| 0060 | 65 | 69 | 62 | 73 | 69 | 6D | 75 | 6C | 61 | 74 | 6F | 72 | 20 | 51 | 30 | 38 | eibsimulator Q08 |
| 0070 | 35 | 1B | 26 | 1B | 52 | 0D | 1B | 08 | 09 | 1B | 22 | 20 | 20 | 20 | 20 | 20 | 5.&.R....." |
| 0080 | 20 | 20 | 20 | 20 | 20 | 20 | 20 | 20 | 20 | 20 | 20 | 20 | 20 | 20 | 20 | 20 | |
| 0090 | 20 | 20 | 20 | 1B | 61 | 0D | 20 | 20 | 20 | 20 | 20 | 20 | 20 | 20 | 20 | 20 | .a. |

| ADR. | 0 | 1 | 2 | 3 | 4 | 5 | 6 | 7 | 8 | 9 | A | B | C | D | E | F | ASCII |
|---|---|---|---|---|---|---|---|---|---|---|---|---|---|---|---|---|---|
| 00A0 | 20 | 20 | 20 | 20 | 20 | 20 | 20 | 20 | 20 | 20 | 20 | 20 | 20 | 20 | 1B | 61 | .a |
| 00B0 | 20 | 20 | 33 | 20 | 20 | 20 | 20 | 20 | 20 | 20 | 20 | 20 | 20 | 20 | 20 | 20 | 3. |
| 00C0 | 20 | 20 | 20 | 20 | 20 | 20 | 20 | 20 | 20 | 20 | 20 | 20 | 1B | 61 | 0D | 20 | .a. |
| 00D0 | 20 | 20 | 20 | 20 | 20 | 20 | 20 | 20 | 20 | 20 | 20 | 20 | 20 | 20 | 20 | 20 | |
| 00E0 | 20 | 20 | 20 | 20 | 20 | 20 | 20 | 1B | 61 | 20 | 20 | 33 | 0D | 20 | 20 | 20 | .a 3. |
| 00F0 | 20 | 20 | 20 | 20 | 20 | 20 | 20 | 20 | 20 | 20 | 20 | 20 | 20 | 20 | 20 | 20 | |
| 0100 | 20 | 20 | 20 | 20 | 20 | 1B | 61 | 0D | 20 | 20 | 20 | 20 | 20 | 20 | 20 | 20 | .a. |
| 0110 | 20 | 20 | 20 | 20 | 20 | 20 | 20 | 20 | 20 | 20 | 20 | 20 | 20 | 20 | 20 | 20 | . |
| 0120 | 1B | 61 | 20 | 20 | 33 | 0D | 20 | 20 | 20 | 20 | 20 | 20 | 20 | 61 | 20 | 20 | .a 3. |
| 0130 | 20 | 20 | 20 | 20 | 20 | 20 | 20 | 20 | 20 | 20 | 20 | 20 | 20 | 20 | 1B | 61 | .a. |
| 0140 | 0D | 20 | 20 | 20 | 20 | 20 | 20 | 20 | 20 | 20 | 20 | 20 | 20 | 20 | 20 | 20 | . |
| 0150 | 20 | 20 | 20 | 20 | 20 | 20 | 20 | 20 | 20 | 1B | 61 | 20 | 20 | 33 | 0D | 20 | .a 3. |
| 0160 | 20 | 20 | 20 | 20 | 20 | 20 | 20 | 20 | 20 | 20 | 20 | 20 | 20 | 20 | 20 | 20 | |
| 0170 | 20 | 20 | 20 | 20 | 20 | 20 | 20 | 1B | 61 | 20 | 20 | 20 | 20 | 20 | 20 | 20 | .a. |
| 0180 | 20 | 20 | 20 | 20 | 20 | 20 | 20 | 20 | 20 | 20 | 20 | 20 | 20 | 20 | 20 | 20 | |
| 0190 | 20 | 20 | 1B | 61 | 20 | 20 | 33 | 0D | 20 | 20 | 20 | 20 | 20 | 20 | 20 | 20 | .a 3. |
| 01A0 | 20 | 20 | 20 | 20 | 20 | 20 | 20 | 20 | 20 | 20 | 20 | 20 | 20 | 20 | 20 | 20 | |
| 01B0 | 1B | 61 | 0D | 20 | 20 | 20 | 20 | 20 | 20 | 20 | 20 | 20 | 20 | 20 | 20 | 20 | .a. |
| 01C0 | 20 | 20 | 20 | 20 | 20 | 20 | 20 | 20 | 20 | 20 | 20 | 1B | 61 | 20 | 20 | 33 | .a 3. |
| 01D0 | 0D | 20 | 20 | 20 | 20 | 20 | 20 | 20 | 20 | 20 | 20 | 20 | 20 | 20 | 20 | 20 | . |

COMMANDS OF THE COMPUTER

PRINTOUTS

METHOD OF SETTING THE OPERATING PARAMETERS IN A MICROPROCESSOR-CONTROLLED TYPEWRITER OR OTHER MICROPROCESSOR-CONTROLLED OFFICE MACHINE

BACKGROUND OF THE INVENTION

The present invention relates to a method of setting the operating parameters in a microprocessor-controlled typewriter or other microprocessor-controlled office machine of similar construction having a data input keyboard, a memory for storing all operating parameters, and an apparatus for recalling and displaying the operating characters on a record carrier.

In order to operate a microprocessor-controlled typewriter or similar microprocessor-controlled office machine, various operating parameters must be set to adapt the machine to the operating conditions of external devices connected with it and to enable the machine to cooperate with external devices without problems. Such operating parameters are, for example, interface settings, print format, and logging operations, among others.

It is known to perform the set-up of a microprocessor-controlled office machine according to a code by use of coding switches. A microprocessor-controlled visual display unit including a printer is also known as shown in German Patent No. 2,743,790 in which the operating parameters are permanently programmed in by use of set-up switches, but which can be changed if required by use of a keyboard. In this prior art device, all possible parameter values of the operating parameters are stored in a memory of the microprocessor and are called up either by actuation of the set-up switches or by the values input by way of the keyboard, and these parameter values are then stored in a special memory region. From there, they are called up to control a set-up device for the operating parameters. Additionally, it is possible to display all possible operating parameter values on a screen which is part of the device and to identify the parameter values which are set on the screen. Although this prior art device avoids use of complicated coding switches, the setting of the operating parameter values is still relatively complicated.

SUMMARY OF THE INVENTION

It is an object of the present invention to provide a method for setting the operating parameters in a microprocessor controlled typewriter or other microprocessor-controlled office machine, in which the operating parameters can be accessed and selected in a relatively uncomplicated and rapid manner, without requiring special coding switches or other coding set-up devices.

These and other objects are accomplished according to the invention by the provision of a method for setting the operating parameters in a microprocessor-controlled typewriter, the typewriter having a microprocessor, a set-up initiating actuator, a data input keyboard which includes (i) a printer-advance actuator, (ii) a first command actuator, and (iii) a second command actuator, a memory for storing operating parameters for the typewriter, a record carrier, and a printing apparatus for recalling and displaying the operating characters on the record carrier, including the steps of:

(a) actuating the set-up initiating actuator disposed on the keyboard to cause the microprocessor to enter a set-up mode and to recall from the memory a set-up plane which lists a plurality of sub-planes;

(b) displaying the set-up plane on the record carrier by the printing apparatus;

(c) selecting one of the plurality of sub-planes by using the printer-advance actuator to cause the printing apparatus to move to a position adjacent to indicia corresponding to the selected sub-plane;

(d) actuating the first command actuator to cause the microprocessor to recall from memory the selected sub-plane and to print the available values of the parameters of the selected sub-plane upon the record carrier;

(e) selecting one of the available values of a chosen parameter of the selected sub-plane by using the printer-advance actuator to cause the printing apparatus to move to a position adjacent to indicia corresponding to a selected one of the available values of the chosen parameter;

(f) actuating the first command actuator to cause the microprocessor to store the selected one of the available values of the chosen parameter in the memory;

(g) actuating the second command actuator to cause the microprocessor to (i) replace the stored values of the parameters of the selected sub-plane with the selected ones of the available values of the parameters of the selected sub-plane, (ii) cause the printing apparatus to indicate the selected ones of the available values of the parameters of the selected sub-plane on the record carrier, (iii) recall from the memory the set-up plane, and (iv) cause the printing apparatus to display the set-up plane on the record carrier.

Therefore, only three keys are required to access and select the operating parameters in this type of microprocessor-controlled typewriter or other microprocessed-controlled office machine of similar construction. These three keys are preferably the space bar, the carriage-return/line feed key, and the RELOCATE key.

If the printout of an entire sub-plane is not necessary, the process of printing the selected sub-plane can be terminated by actuation of the RELOCATE key. This simultaneously causes the microprocessor to initiate a jump back into the set-up plane. This avoids the printing out of unnecessary parameter values, which results in less consumption of paper.

The invention permits access to and selection of the operating parameters by use of the keys already conventionally provided on the typewriter keyboard.

Further advantageous features and modifications of the inventive method are contemplated as being within the scope of the present invention.

BRIEF DESCRIPTION OF THE DRAWINGS

FIGS. 3 to 9 are displays of individual sub-planes which can be called up from the set-up plane of FIG. 2, and from which operating parameters can be changed.

DETAILED DESCRIPTION OF THE PREFERRED EMBODIMENT

Figure 1:
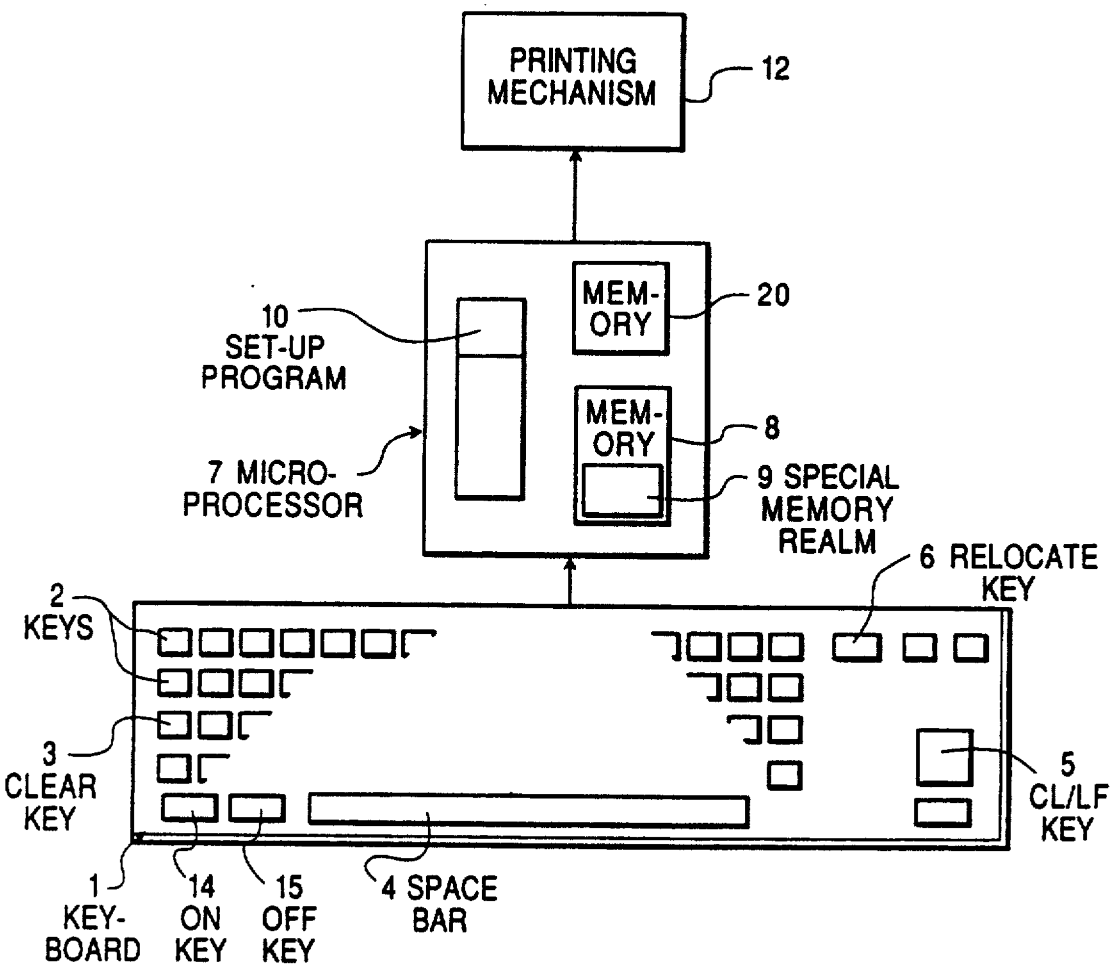
FIG. 1 is a schematic representation of an arrangement for implementing the method according to the invention.
Figure 10:
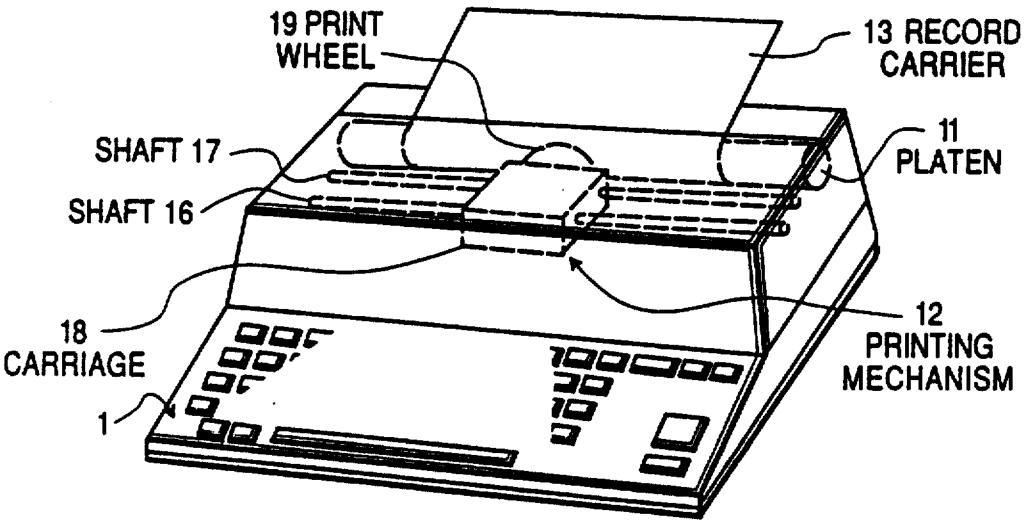
FIG. 10 is a perspective view of a typewriter usable in the preferred embodiment.

FIG. 1 shows a keyboard 1 for a printing apparatus or mechanism 12 which is shown in FIG. 10. The keyboard 1 includes, as seen in FIG. 1, a known type of keyboard having keys 2, a space bar 4, a carriage return/line feed key 5 and a RELOCATE key 6. Additionally, the keyboard 1 includes a CLEAR key 3, an ON key 14, and an OFF key 15 which operates an ON-OFF switch (not shown) for the printing mechanism 12.

The keyboard 1 is shown as being connected to a microprocessor or microcomputer 7 which includes, in addition to the usual components of a microprocessor or microcomputer, a memory 8 having a special memory region 9 therein. Moreover, a set-up program 10, schematically illustrated in FIG. 1, is provided for setting the operating parameters of the printing mechanism 12. The program 10 can be preprogrammed in another memory region of the microcomputer 7.

The microcomputer 7 itself actuates the printing mechanism 12 which prints on a record carrier, preferably the record carrier 13 shown in FIG. 10, which is a sheet of paper. As seen in FIG. 10, the record carrier 13 is transported in a known manner around a platen 11. The printing mechanism 12 includes a print wheel 19 which is positionable by a stepping motor (not shown) and which is rotatably mounted on a carriage 18. The carriage 18 is transportable along shafts 16 and 17 which are parallel to the longitudinal axis of the platen 11, which is adjacent to the record carrier 13. A memory 20 in the microcomputer 7 contains the required respective setting data for the print wheel 19. The symbol K1 represents the space bar 4, and the symbol K2 represents the carriage return/line feed (CR/LF) key 5.

Figure 2:
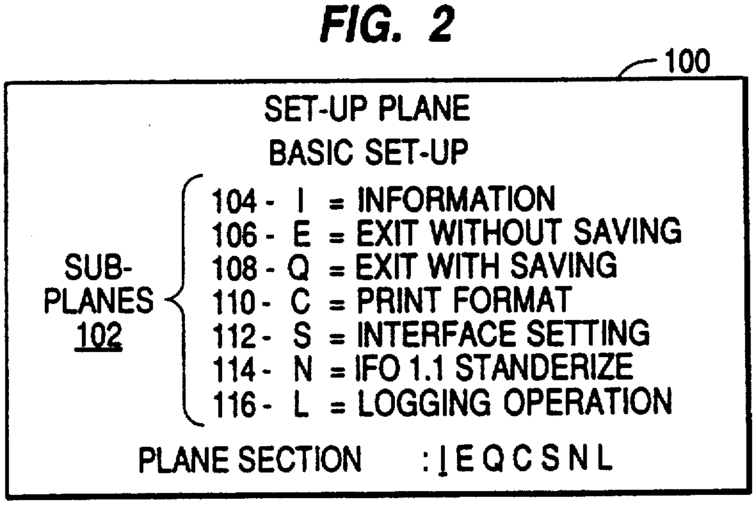
FIG. 2 is a display of a set-up plane used in conjunction with a printing apparatus to access individual sub-planes for accessing operating parameters.

To set the operating parameters of the microprocessor-controlled typewriter according to the invention, the machine operator initially depresses the ON key 14 and the CLEAR key 3, thereby causing a set-up plane 100 shown in FIG. 2 to be printed on the paper. This set-up plane print-out offers a selection several sub-planes 102 to the operator, including sub-planes 104, 106, 108, 110, 112, 114 and 116 having names such as interface setting (112), print format (110), information (104), logging operation (116) and others as discussed hereinafter. The carriage 18 and the print wheel 19 initially stop at the first symbol representing a sub-plane. The sub-plane is selected by moving the printer 18, 19 to the selected sub-plane, for example, "I" of FIG. 2. Then the carriage return/line feed (CR/LF) key 5 is actuated, initially causing the sub-plane "I" to be underlined and the program to jump out of the search loop. The program calls up from memory (or jumps) into the sub-plane "I" (104), whereupon the printer 18, 19 prints out all of the information of FIG. 3 onto the paper 13. The respectively selected values for the individual parameters are specially identified.

By means of the space bar 4, the next parameter in the sub-plane "I" (104) is selected, with the presently set parameters being indicated by the position of the printer 18, 19. After all of the information has been selected, the program automatically jumps back into the set-up plane shown in FIG. 2.

Figure 5:
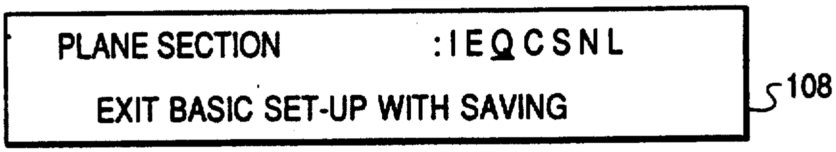

After selection of the values for the parameters of FIG. 3 has been completed and the program returned to the set-up plane, the printer 18, 19 is set to "E" (106) and the CR/LF key 5 depressing causing underlining of the letter "E" and causing the program to jump into the subplane "E" (106). Then the words "basic set-up without saving" are out on the paper 13. After this printout, the program again jumps back into the set-up plane 100 of FIG. 2. The same procedure takes place if the sub-plane "Q" (108) is selected. However, in this event storage takes place of those values of the operating parameters which have been selected, as shown in FIG. 5.

FIG. 6 shows the printed output which results from the selection of the sub-plane "C" (110). After positioning the printer 18, 19 at the symbol "C" representing in set-up plane 100 representing this sub-plane, the CR/LF key 5 is actuated, causing the parameters for the print format to be printed out. This causes the printer 18, 19 to jump to the first value "766/norm" of the first parameter called "character set". If this value is to be maintained, the CR/LF key 5 is actuated, causing the character set "766/norm" to be underlined by the printer 18, 19, as shown in FIG. 6, and causing the program to jump to the next parameter "Auto LF". Here, the printer 18, 19 jumps to the first value "On". If this value is not to be maintained, the printer 18, 19 is positioned, by actuation of the space bar 4, to the next following value "Off". Then the CR/LF key 5 is actuated and the program jumps to the next parameter "Auto CR". The selection of a value for this parameter occurs in the manner described above, as does the selection of the subsequent parameters shown in FIG. 6.

If, after selection of a value for one of the parameters of FIG. 3, the RELOCATE key 6 is depressed instead of the CR/LF key 5, then, after underlining the last selected parameter value, the program is caused to jump back into the set-up plane 100 of FIG. 2. The set-up plane 100 includes five sub-planes and two jumps. The jump location, i.e. the target sub-plane or jump sub-plane, is always shown underlined. Two of the five sub-planes are provided for the setting of parameters.

FIG. 7 shows the sub-plane "S" (112), which is used for the setting of interface parameters, in which the selection of parameter values and the jump back into the set-up plane occurs as described above. FIG. 8 shows the sub-plane "L" (116) which is used for a logging operation, and the sub-plane "N" (114) (FIG. 9) is used for setting the default parameters.

Only three function keys are required to select and actuate the parameters in the method according to the invention for setting the operating parameters in a microprocessor controlled typewriter or other office machine of similar construction and these are, according to one advantageous embodiment of the invention, the space bar 4, the carriage return key 5, and the RELOCATE key 6. Therefore, no special keys need be provided. A particular advantage of the method according to the invention is that actuation of the RELOCATE key 6 causes the printing process in one sub-plane to be terminated. It is therefore possible to suppress print-out of parameter values which are not needed.

Figure 9:
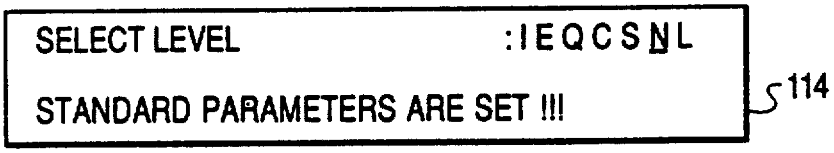

FIG. 9 illustrates sub-plane "N" (114) which is used to select standard parameters. By selecting option "N" the settings shown in Table I below are then in effect.

TABLE I

| Parameter | Default Value |
|---|---|
| Character set (CS) | 558/Stan. |
| Auto LF | off |
| Auto CR | off |
| Bi-directional print | on |
| Form/Page length | 70 |
| Top margin | 5 |
| Bottom margin = Form L. minus | 0 |
| Pitch | 10 |
| Proportional spacing | Diablo |
| Line spacing | 1 |
| Form feed with paper insertion | no |
| Paper feed | manual |
| Memory text transfer mode | Diablo |
| External data routing | no |
| Interface | Centronics |
| Baud rate | 1200 |
| Data | 8 bit |
| Parity | without |
| Stop bit | 1 |
| Handshake | RTS/CTS |
| Echo | on |
| Request for ON-LINE | yes |
| CR key | CR |
| Transmit code | Diablo |

The typewriter of FIG. 10 has been discussed hereinabove with respect to FIG. 1. The microprocessor 7 shown in FIG. 1 can be bodily incorporated within the housing of the typewriter shown in FIG. 10, or it can be provided separately from the housing of the typewriter and connected for communication therewith.

Figure 11:
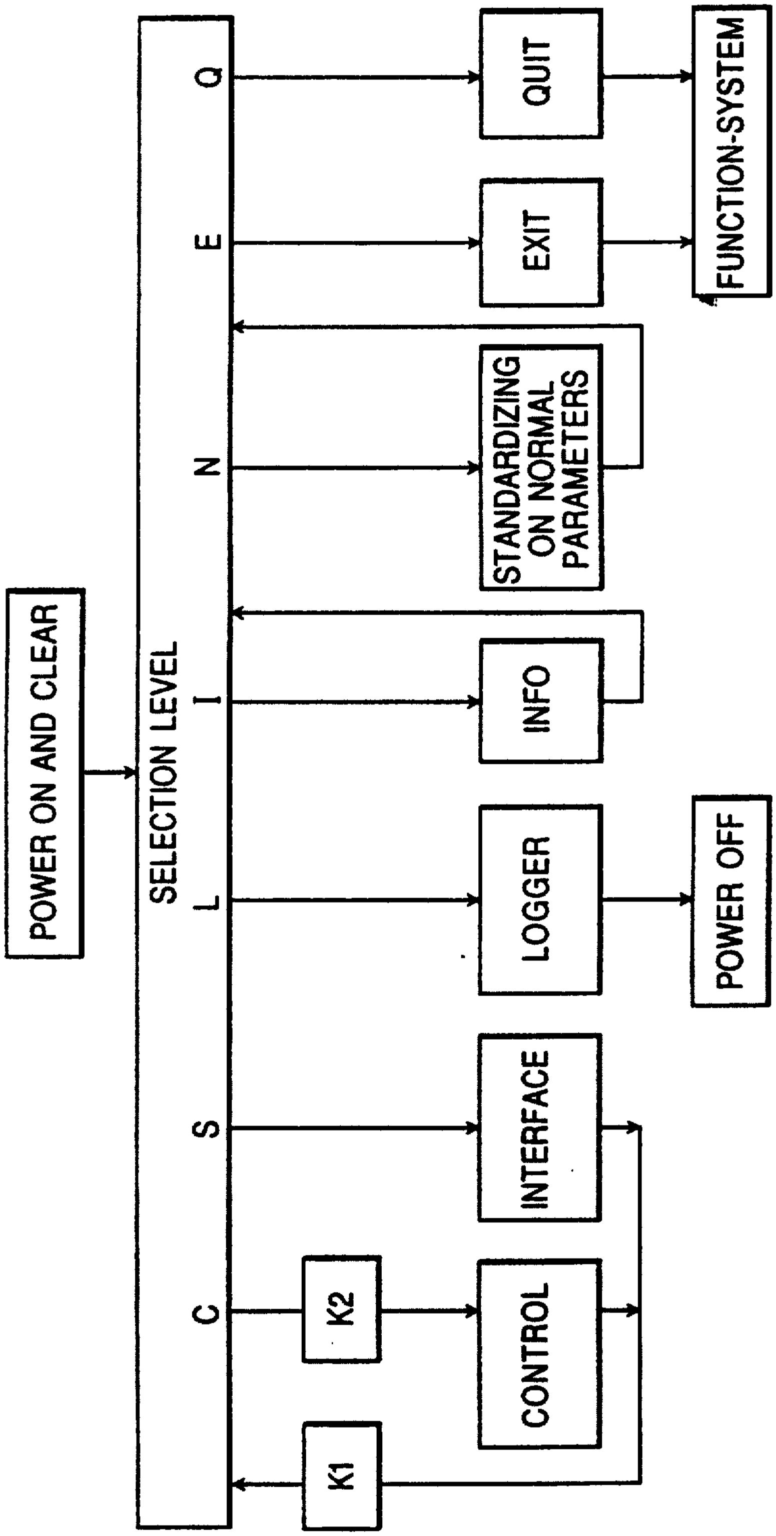
FIG. 11 is a flowchart schematically indicating the process for selection of sub-planes and exit therefrom.

FIG. 11 schematically shows the process for selecting the various sub-planes listed in FIG. 2. After switching on the computer 7 and the printer 12 by depressing the ON key 14 and the CLEAR key 3, the printer 18, 19 prints the list shown in FIG. 2 containing the sub-plane selection list. The user can advance the printer 18, 19 by pressing the space bar H (K1) to the next character in the plane selection list. The operator can continue to press the space bar 4 until the printer 18, 19 reaches the character representing the desired sub-plane. Upon pressing the CR/LF key 5 when the printer 18, 19 is adjacent to a particular character, that character will be underlined and the selected sub-plane called up and printed as described hereinabove. All of the information set forth in the selected sub-plane, for example the print format information in the sub-plane "C" (110), will be printed out and the printer 18, 19 will stop at the value of the listed parameter which has been set. If this set value is to remain unchanged, the CR/LF key 5 should be pressed, thereby causing the set value to be underlined and causing the printer 18, 19 to advance to the next line of available values for the next parameter. The operator can thereby select values for each of the parameters of the selected sub-plane. At any time, depression of the RELOCATE key 6 causes the microprocessor 7 to immediately return to the set-up plane of FIG. 2, from which another sub-plane can be selected.

Figure 4:
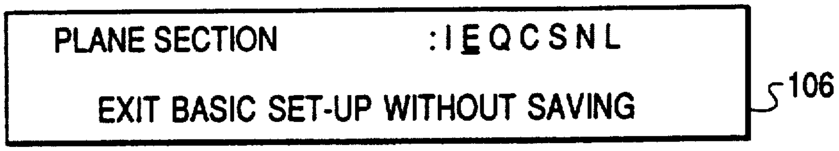

The printer 18, 19 can be advanced until it is adjacent the character "I", for example, and the CR/LF key 5 depressed, thereby causing the printer 18, 19 to underline the symbol "I". The microprocessor 7 then will call up the sub-plane "I" shown in FIG. 3. Selection of the sub-plane "E" causes the parameters which have just been set to be transferred to the printer, without replacing the previously set values with those which have just been set in the sub-plane "E". In this event, the previous values for the parameters set for the respective sub-plane remain in effect. Selection of the sub-plane "E" is illustrated in FIG. 4. If the sub-plane "Q" is selected, the values of the parameters which have just been set are stored, and become the new set values for the respective parameters even when the typewriter is turned off and then on again. Selection of the sub-plane "Q" is illustrated in FIG. 5.

When the sub-plane "L" is selected, the typing system will be switched into the operating mode of a data logger. The "logger" mode is activated by pressing the ON-LINE function. All data received by the interface of the typewriter will be converted into hexadecimal values and passed on to the printing apparatus 18, 19. The keyboard 1 is rendered inoperative except for the ON/OFF-LINE and form feed keys.

When the typing system has been switched into its ON/LINE function, an internal data counter (not shown) of the microprocessor 7 is set to zero. The data received at the interface of the typewriter will be printed out in blocks of 16 characters, as illustrated in FIG. 8. The hexadecimal values are converted into printable characters which are printed to the right of the respective line of data printed out in each block, as shown in FIG. 8 above the legend printouts. Non-printable characters are represented by a period. Printout occurs line-by-line. When the typing system of the invention has been switched over to its "OFF LINE" status, and upon subsequent depression of the carriage return key (CR/LF) 5, the remaining data (corresponding to an ASCII translation) of an incomplete line will be printed out. The printer or the interface preferably includes a buffer memory, as is conventional, which can be cleared by depression of the CLEAR key 3. The printout can be stopped by switching the typewriter to "OFF LINE", and therefore errors which occur during printing (for example, those errors requiring the ribbon to be changed, additional paper to be supplied, and so on) can be corrected.

The data logger function discussed above can be terminated only by turning the typing system "OFF". FIG. 8 shows on the left side the commands sent by a computer to the printing apparatus 12, and shows on the right side the corresponding printout for each block of 16 data characters.

Figure 13:
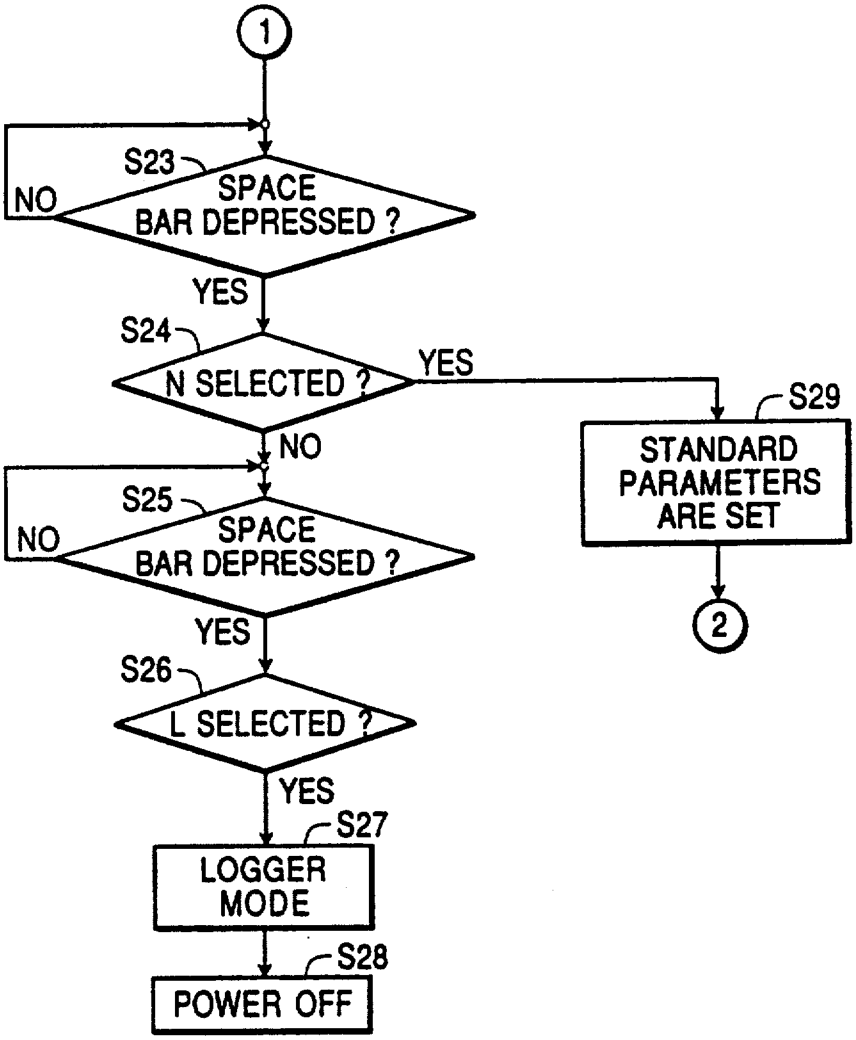
FIG. 13 is the remaining portion of the flowchart of FIG. 12.
Figure 12:
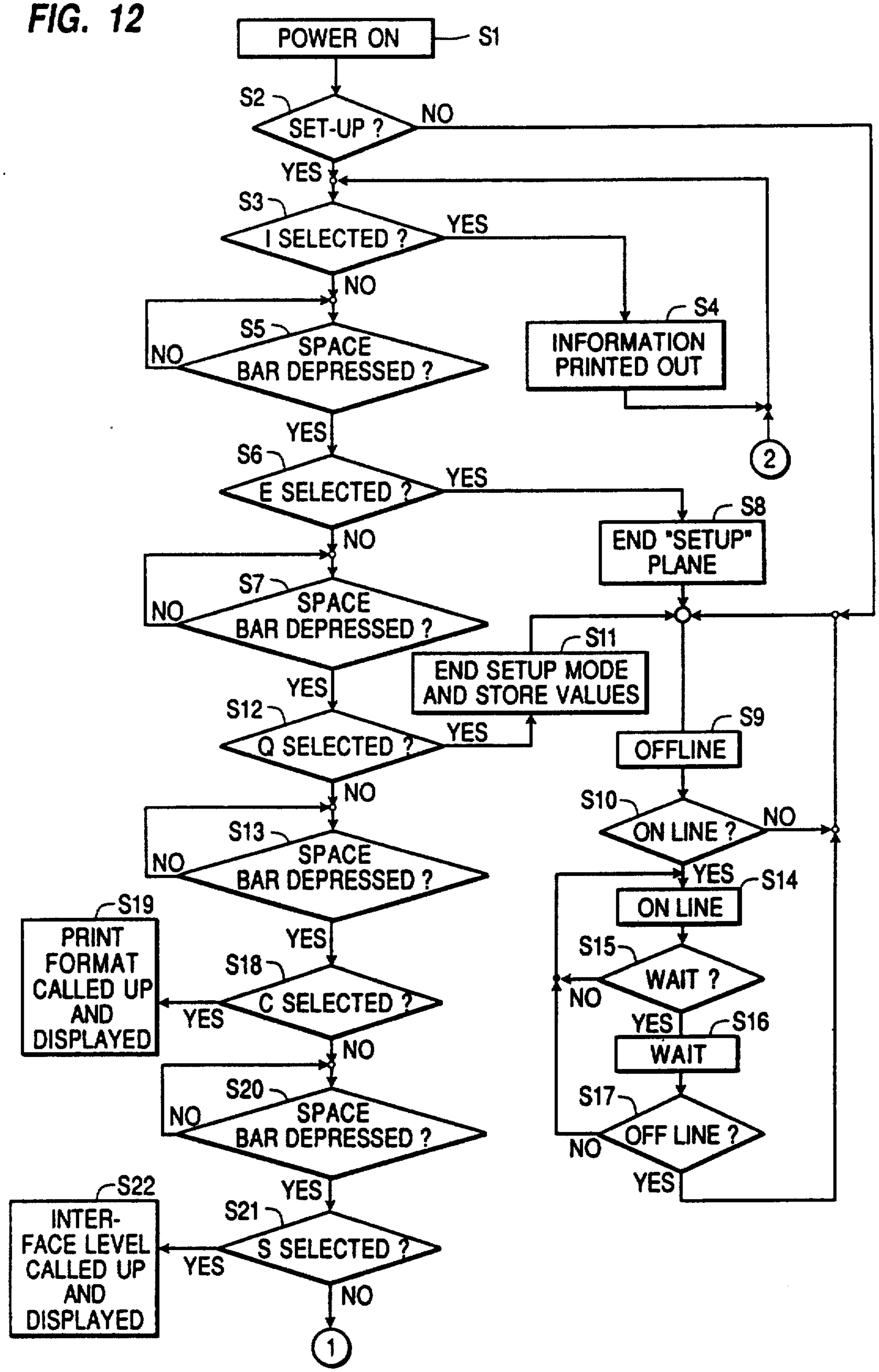
FIG. 12 is a first portion of a flowchart corresponding to a preferred microprocessor program for implementing the method of the invention.

FIGS. 12 and 13 together form a complete flowchart of the operations conducted by the microprocessor 7 according to the invention. The function parameters which are to function in the ON-LINE mode can be set in the "adjust parameter" mode, namely by using the set-up plane of FIG. 2 to access those parameters which can be set in the sub-planes listed in FIG. 2.

The operator is guided through the "adjust parameter" mode by a menu procedure. To recall the "adjust parameter" mode, the typewriter must be turned on using the ON key 14, as shown in step S1. At step S2, a check is performed to determine whether the key used to select the set-up mode, for example, the CLEAR key 3 according the preferred embodiment, has been pressed. If not, the typewriter can be used in the "OFF-LINE" mode as shown in step S9. From there, a check is performed in step S10 to determine whether to change the typewriter to the "ON-LINE" mode. If so, the microprocessor 7 causes the typing system to operate in an "ON-LINE" mode, so that the typing system operates as a printer (for example, for printing computer data received from a computer) and the keyboard 1 is blocked as discussed hereinabove. At steps S15 and S16, the typewriter is checked to determined whether it is ready to receive commands from the microprocessor 7 concerning, for example, paper size, whether the ribbon is properly placed for operation, and so on. If the typewriter is ready to receive commands from the microprocessor 7, the program branches from block S15 to block S14 which operates in the manner discussed hereinabove. If the typewriter is not ready to receive commands from the microprocessor 7 at step S15, the program branches to step S16 and the printing operation is suspended, with the program then branching to step S17. In step S17, a check is made whether the typewriter mode (the "ON-LINE" status) should be changed to the "OFF-LINE mode at step S9.

At step 252, if the key for actuating the set-up operation has been actuated, a check is then conducted to determine whether the "adjust parameter" mode "I" has been selected by actuation of the carriage return key 5. In this event, the letter "I" listed on the set-up plane 100 of FIG. 2 is underlined, and information is printed out corresponding to that shown in FIG. 3, in which the present values of the parameters are underlined.

If the "adjust parameter" mode "I" has not been selected, then the program branches to step S5 to determine whether the space bar 4 has been actuated to advance the printer 18, 19. For example, if the space bar 4 is depressed until the printer 18, 19 reaches the parameter "E" in the display of FIG. 2, the carriage return key 5 can be depressed to underline the letter "E" and to perform the function indicated thereby, namely to exit the set-up plane without saving the newly-selected values of the parameters. If the subplane "E" has not been selected, the program branches to step S7 to determine whether the space bar 4 has been depressed; if not, the program continues to repeat step S7 until the space bar 4 is depressed. When the space bar 4 is depressed, the program branches to step S12 to determine whether the carriage return key 5 has been depressed, in which case the sub-plane "Q" is selected, so that the program branches to step S11 wherein the newly-set parameters are stored and the set-up mode is ended. In a similar manner, the microprocessor 7 determines whether another depression of the space bar 4 has occurred at step S13, and whether the sub-plane "C" has been selected at step S18. If the sub-plane "C" has not been selected, the microprocessor 7 determines at step S20 whether the space bar 4 has been depressed, and if so, whether the sub-plane "S" has been selected. If the sub-plane plane "S" has been selected, then the interface parameters, shown in FIG. 7, are called-up at step S22. If the sub-plane "C" has been selected, the program branches to step S19 and the print format parameters shown in FIG. 6 are called-up.

If the sub-plane "S" has not been selected, the program branches to step S23 in FIG. 13, which determines whether the space bar 4 has been depressed. If so, the program branches to step S24, wherein the microprocessor 7 determines whether the sub-plane "N" has been selected. If so, the program branches to step S29, instructing the microprocessor 7 to set the predetermined standard parameters, as listed in Table I hereinabove, and the program branches back to step S3 shown in FIG. 12.

If the sub-level "N" of step S24 has not been selected, the microprocessor 7 determines whether the space bar 4 has been depressed. If so, the microprocessor 7 determines whether the sub-plane "L" has been selected at step S26. If so, the logger mode is selected at step S27, and the system remains in the logger mode until the power is turned off as indicated at step S28.

The present disclosure relates to the subject matter disclosed in German Application No. P 37 29 097.5 of Sept. 1st, 1987, the entire specification of which is incorporated herein by reference.

It will be understood that the above description of the present invention is susceptible to various modifications, changes and adaptations, and the same are intended to be comprehended within the meaning and range of equivalents of the appended claims.

We claim:

1. A method of setting operating parameters in a microprocessor-controlled typewriter or like office machine having a microprocessor, a data input keyboard which includes (i) a printer-advance actuator, (ii) a first command actuator, (iii) a second command actuator, and (iv) a set-up initiating actuator, a memory for storing operating parameters for the typewriter, a record carrier, and a printing apparatus for selecting and printing the operating parameters and selectable values available therefor on the record carrier, including the steps of:

(a) recalling from the memory a set-up plane which lists a plurality of sub-planes containing the operating parameters and selectable values for the operating parameters in response to actuating the set-up initiating actuator;

(b) printing the set-up plane on the record carrier with the printing apparatus;

(c) moving the printing apparatus to a position adjacent to an indicia corresponding to a selected sub-plane by actuating the printer-advance actuator;

(d) recalling from memory the selected sub-plane, printing the operating parameters and values available for the operating parameters of the selected sub-plane upon the record carrier and positioning the printing apparatus at a location corresponding to one of the parameters printed on the record carrier in response to actuating the first command actuator;

(e) moving the printing apparatus to a position corresponding to a selected one of the available values of the one parameter by actuating the printer-advance actuator; and (f) selectively: (i) storing the selected one of the available values of the one parameter in the memory and moving the printer apparatus to a location corresponding to another parameter printed on the record carrier and repeating steps (e) and (f) with respect to that parameter in response to actuating the first command actuator; and (ii) storing the selected one of the available values of the one parameter, recalling from the memory the set-up plane, and causing the printing apparatus to print the set-up plane on the record carrier in response to actuating the second command actuator.

2. A method as defined in claim 1, further comprising the step of underlining the selected one of the available values of the parameter selected in step (e) in response to actuation of the first command actuator of step (f) (i) and in response to the second command actuator of step (f) (ii).

3. A method as defined in claim 1, wherein the printer-advance actuator, the first command actuator, and the second command actuator respectively have other functions when the microprocessor is in a mode other than that of setting parameters.

4. A method as defined in claim 1, wherein the set-up initiating actuator comprises an ON switch of the data input keyboard.

5. A method as defined in claim 1, wherein the set-up initiating actuator comprises a CLEAR key on the data input keyboard.

6. A method as defined in claim 1, wherein the printer-advance actuator comprises a space bar.

7. A method as defined in claim 1, wherein the first command actuator comprises a carriage return key.

8. A method as defined in claim 1, wherein the second command actuator comprises a RELOCATE key.

9. A method as defined in claim 1, further comprising the step of providing an information sub-plane as one of the plurality of sub-planes.

10. A method as defined in claim 1, further comprising providing a print format sub-plane as one of the plurality of sub-planes.

11. A method as defined in claim 1, further comprising providing an interface setting sub-plane as one of the plurality of sub-planes.

12. A method as defined in claim 1, further comprising providing a standardize sub-plane as one of the plurality of sub-planes.

13. A method as defined in claim 1, further comprising providing a logging operation sub-plane as one of the plurality of sub-planes.

14. A method as defined in claim 1, further comprising providing an "exit without saving" sub-plane as one of the plurality of sub-planes.

15. A method as defined in claim 1, further comprising providing an "exit with saving" sub-plane as one of the plurality of sub-planes.

* * * * *